US011556698B2

(12) United States Patent
Galitsky

(10) Patent No.: US 11,556,698 B2
(45) Date of Patent: Jan. 17, 2023

(54) AUGMENTING TEXTUAL EXPLANATIONS WITH COMPLETE DISCOURSE TREES

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 146 days.

(21) Appl. No.: 16/902,015

(22) Filed: Jun. 15, 2020

(65) Prior Publication Data

US 2021/0117613 A1  Apr. 22, 2021

Related U.S. Application Data

(60) Provisional application No. 62/924,360, filed on Oct. 22, 2019.

(51) Int. Cl.
*G06F 40/35* (2020.01)
*G06F 40/169* (2020.01)
(Continued)

(52) U.S. Cl.
CPC .......... *G06F 40/169* (2020.01); *G06F 40/289* (2020.01); *G06F 40/35* (2020.01); *G06K 9/6259* (2013.01); *G06N 20/00* (2019.01)

(58) Field of Classification Search
CPC ...... G06F 40/35; G06F 40/211; G06F 40/253; G06F 40/289; G06F 40/169; G06N 20/00; G06K 9/6259
See application file for complete search history.

(56) References Cited

U.S. PATENT DOCUMENTS 6,112,168 A * 8/2000 Corston ................ G06F 40/253
704/9
6,961,692 B1  11/2005 Polanyi et al.
(Continued)

FOREIGN PATENT DOCUMENTS

JP  2001523019  11/2001
JP  2005122743   5/2005
WO    9921104   4/1999

OTHER PUBLICATIONS

Boris Galitsky, "Discovering Rhetorical Agreement between a Request and Response", publisher: Dialogue and Discourse, published: Dec. 2017, pp. 167-205 (Year: 2017).*

(Continued)

*Primary Examiner* — Wilson W Tsui
(74) *Attorney, Agent, or Firm* — Kilpatrick Townsend & Stockton LLP

(57) ABSTRACT

Systems, devices, and methods discussed herein provide improved autonomous agent applications that are configured to provide explanations in response to user-submitted questions. Training data comprising a question, and an explanation pair may be accessed. A discourse tree and an explanation chain can be constructed from the explanation. The explanation chain may identify logical relationships between two entities of elementary discourse units identified from the discourse tree. A query may be submitted for the two entities, and a set of search results can be mined to identify text linking the two entities. An additional discourse tree can be generated from the text of a search result. The additional discourse tree can be combined with the original discourse tree to generate a complete discourse tree. A model may be trained using this augmented data (e.g., the complete discourse tree) to improve the quality of explanations provided by the autonomous agent application.

20 Claims, 8 Drawing Sheets

(51) Int. Cl.
*G06N 20/00* (2019.01)
*G06F 40/289* (2020.01)
*G06K 9/62* (2022.01)

(56) References Cited

U.S. PATENT DOCUMENTS

| | | | |
|---|---|---|---|
| 7,013,259 | B1 | 3/2006 | Polanyi et al. |
| 9,171,037 | B2 | 10/2015 | Galitsky et al. |
| 9,449,080 | B1 | 9/2016 | Zhang |
| 10,853,574 | B2 | 12/2020 | Galitsky |
| 11,100,144 | B2 | 8/2021 | Galitsky |
| 11,295,085 | B2 | 4/2022 | Galitsky |
| 11,328,016 | B2 | 5/2022 | Galitsky |
| 2002/0046018 | A1* | 4/2002 | Marcu .................. G06F 40/35 704/9 |
| 2003/0138758 | A1 | 7/2003 | Burstein et al. |
| 2004/0044519 | A1 | 3/2004 | Polanyi et al. |
| 2004/0158452 | A1 | 8/2004 | Polanyi et al. |
| 2004/0158453 | A1 | 8/2004 | Polanyi et al. |
| 2007/0143098 | A1* | 6/2007 | Van Den Berg ...... G06F 40/35 704/1 |
| 2015/0081277 | A1 | 3/2015 | Behi |
| 2017/0358295 | A1 | 12/2017 | Roux et al. |
| 2018/0052818 | A1* | 2/2018 | Bethard .............. G06F 16/3344 |
| 2018/0329880 | A1* | 11/2018 | Galitsky ............. G06F 40/211 |
| 2018/0357221 | A1* | 12/2018 | Galitsky ............. G06F 40/205 |
| 2018/0365228 | A1 | 12/2018 | Galitsky |
| 2018/0365593 | A1 | 12/2018 | Galitsky |
| 2019/0005027 | A1 | 1/2019 | He et al. |
| 2019/0095420 | A1* | 3/2019 | Galitsky ................ G06F 16/00 |
| 2019/0370604 | A1 | 12/2019 | Galitsky |
| 2019/0371299 | A1 | 12/2019 | Jiang et al. |
| 2020/0012720 | A1* | 1/2020 | Elson ................ G06F 16/2246 |

OTHER PUBLICATIONS

Boris Galitsky, "Chatbot with a Discourse Structure-Driven Dialogue Management", publisher: Association for Computational Linguistics, published: Apr. 2017, pp. 87-90 (Year: 2017).*
Galitsky et al., "Learning Communicative Actions of Conflicting Human Agents," Journal of Experimental & Theoretical Artificial Intelligence, vol. 20, No. 4, Dec. 2008, pp. 277-317.
Galitsky, "Customers' Retention Requires an Explainability Feature in Machine Learning Systems They Use," AAAI Spring Symposium Series, 2018, pp. 214-220.
Jansen et al., "Discourse Complements Lexical Semantics for Nonfactoid Answer Reranking," Proceedings of the 52nd Annual Meeting of the Association for Computational Linguistics, Jun. 23-25, 2014, pp. 977-986.
Surdeanu et al., "Two Practical Rhetorical Structure Theory Parsers," Proceedings of the Conference of the North American Chapter of the Association for Computational Linguistics, Human Language Technologies, Software Demonstrations (NAACL HLT), May 31-Jun. 5, 2015, pp. 1-5.
Galitsky, "Matching Parse Thickets for Open Domain Question Answering," Data & Knowledge Engineering, vol. 107, Jan. 2017, pp. 24-50.
Joty et al., "Discriminative Reranking of Discourse Parses Using Tree Kernels," Proceedings of the 2014 Conference on Empirical Methods in Natural Language Processing (EMNLP), Association for Computational Linguistics EMNLP 2014, Oct. 25-29, 2014, pp. 2049-2060.
Moschitti, Efficient Convolution Kernels for Dependency and Constituent Syntactic Trees, In Proceedings of the 17th European Conference on Machine Learning, Berlin, Germany, 2006, pp. 318-329.
Dunne et al., "Computational Models of Argument," Proceedings of COMMA 2006, IOS Press, 2006, 353 pages.
Lo Cascio, "Grammatica dell'Argomentare: strategie e strutture," [A grammar of Arguing: strategies and structures] Firenze: La Nuova Italia, 1991, 3 pages.

Walton, "Dialogical Models of Explanation," Explanation-Aware Computing: Papers from the 2007 AAAI Workshop, Association for the Advancement of Artificial Intelligence, Technical Report WS-07-06, AAAI Press, 2007, 9 pages.
Lee, Genres, Registers, Text Types, Domains and Styles: Clarifying the Concepts and Navigating a Path Through the BNC Jungle, Language Learning & Technology, Sep. 2001, vol. 5, No. 3, pp. 37-72.
Toulmin, "The Uses of Argument," Cambridge At the University Press, 1958, 259 pages.
U.S. Appl. No. 16/408,224 , Notice of Allowance dated Jan. 7, 2022, 9 pages.
U.S. Appl. No. 16/408,224 , Supplemental Notice of Allowability dated Feb. 15, 2022, 4 pages.
U.S. Appl. No. 16/995,302 , Notice of Allowance dated Jan. 7, 2022, 11 pages.
First Examination Report dated Mar. 25, 2022 in related India application No. 202047007045, 6 pages.
Galitsky et al., On a Chat Bot Finding Answers with Optimal Rhetoric Representation, Proceedings of Recent Advances in Natural Language Processing, Nov. 10, 2017, pp. 253-259.
Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.
Galitsky, et al., Matching sets of parse trees for answering multi-sentence questions, In Proceedings of the International Conference Recent Advances in Natural Language Processing RANLP 2013, pp. 285-293, Hissar, Bulgaria. INCOMA Ltd. Shoumen, Bulgaria.
Sadek et al., A Discourse-Based Approach for Arabic Question Answering, ACM Transactions on Asian and Low-Resource Language Information Processing, vol. 16, No. 2, Article 11, Nov. 4, 2016, pp. 1-18.
Sadek et al., Arabic Rhetorical Relations Extraction for Answering Why and How to Questions, NLDB'12: Proceedings of the 17th international Conference on Applications of Natural Language Processing and Information Systems, Jun. 26, 2012, pp. 385-390.
Verberne et al., Discourse-Based Answering of Why-Questions, TAL Traitement Automatique des Langues, vol. 47, No. 2, Sep. 2007, pp. 21-41.
Radev, A Common Theory of Information Fusion from Multiple Text Sources Step One: Cross-Document Structure, SIGDIAL '00: Proceedings of the 1st SIGdial workshop on Discourse and dialogue, vol. 10, Oct. 2000, pp. 74-83, https://doi.org/10.3115/1117736.1117745.
Maziero, et al., Revisiting Cross-document Structure Theory for multi-document discourse parsing, Information Processing and Management: an International Journal, vol. 50, Issue 2, Mar. 2014 pp. 297-314, https://doi.org/10.1016/j.ipm.2013.12.003.
Mann et al., "Rhetorical Structure Theory: Towards a Functional Theory of Text Organization. Text—Interdisciplinary Journal for the Study of Discourse," 1988, Text 8(3), pp. 243-281. https://doi.org/10.1515/text.1.1988.8.3.243.
Galitsky et al., "Style and Genre Classification by Means of Deep Textual Parsing," Computational Linguistics and Intellectual Technologies, DIALOG, Knowledge Trail Inc., 2016, San Jose, CA, Higher School of Economics, Moscow, Russia, 45 pages.
Galitsky et al., "Detecting Logical Argumentation in Text via Communicative Discourse Tree," Journal of Experimental & Theoretical Artificial Intelligence, 2018, 30 (5), 29 pages. DOI: 10.1080/0952813X.2018.1467492.
Galitsky et al., "Accessing Validity of Argumentation of Agents of the Internet of Everything," Artificial Intelligence for the Internet of Everything, 2019, 18 pages. https://doi.org/10.1016/B978-0-12-817636-8.00011-9.
Ganter et al., "Pattern Structures and Their Projections," In: International Conference on Conceptual Structures, 2001, 16 pages.
Macagno, "Argumentation Schemes," Cambridge University Press, 2008, 58 pages.
2009 Annual Study: Global Cost of a Data Breach, Ponemon Institute, LLC, PGP, Apr. 2010, 36 pages.

(56) References Cited

OTHER PUBLICATIONS

Data Loss Prevention, Trend Micro, Available Online at: http://www.trendmicro.co.in/cloud-content/us/pdfs/business/datasheets/ds_data-loss-prevention.pdf, 2010, pp. 1-2.
Frase HubSpot Assistant, Available online at: https://www.frase.io/?hubspot, Accessed from Internet on Feb. 19, 2021, 12 pages.
Global Security Report 2010, Trustwave, Available Online at: https://www.trustwave.com/Resources/Library/Documents/2010-Trustwave-Global-Security-Report/, 2010, 49 pages.
Sense2vec: Semantic Analysis of the Reddit Hivemind, ExplosionAI, Available online at: https://explosion.ai/demos/sense2vec, Nov. 22, 2019, 10 pages.
Start by Selecting A Make, Available Online at: https://web.archive.org/web/20170823095844/https://www.2carpros.com/, Accessed from Internet on: Oct. 14, 2019, 6 pages.
Task Oriented Dialogue Dataset Survey, AtmaHou, Available online at https://github.com/AtmaHou/Task-Oriented-Dialogue-Dataset-Survey, Accessed from Internet on Feb. 2, 2021, 18 pages.
The bAbI Project, Facebook Babi, Available Online at: https://research.fb.com/downloads/babi/, 2019, 6 pages.
Turku NLP Group, Available Online at: http://bionlp-www.utu.fi/wv_demo/, Accessed from Internet on Nov. 4, 2021, 2 pages.
Word to Vec JS Demo, Turbomaze, Available Online at: http://turbomaze.github.io/word2vecjson/, Accessed from Internet on Nov. 4, 2021, 1 page.
U.S. Appl. No. 16/010,123, Non-Final Office Action dated Feb. 8, 2021, 30 pages.
U.S. Appl. No. 16/010,123, Notice of Allowance dated May 19, 2021, 16 pages.
U.S. Appl. No. 16/145,644, Non-Final Office Action dated Apr. 7, 2020, 17 pages.
U.S. Appl. No. 16/145,644, Notice of Allowance dated Jul. 16, 2020, 10 pages.
U.S. Appl. No. 16/408,224 Supplemental Notice of Allowability dated Apr. 7, 2022, 4 pages.
Alicke et al., Hypocrisy: What counts ?, Philosophical Psychology, vol. 26, No. 5, Aug. 25, 2013, 30 pages.
Allan, Automatic Hypertext Link Typing, Digital Library, vol. 778, No. 2, Mar. 1996, pp. 42-52.
Anelli et al., Knowledge-Aware and Conversational Recommender Systems, Proceedings of the 12th ACM Conference on Recommender Systems, Sep. 2018, pp. 521-522.
Barden et al., Saying One Thing and Doing Another: Examining the Impact of Event Order on Hypocrisy Judgments of Others, Personality and Social Psychology, vol. 31, No. 11, Dec. 1, 2005, pp. 1463-1474.
Bar-Haim et al., Stance Classification of Context-Dependent Claims, Proceedings of the 15th Conference of the European Chapter of the Association for Computational Linguistics: vol. 1, Apr. 3-7, 2017, pp. 251-261.
Barzilay et al., Using Lexical Chains for Text Summarization, Proceedings of the ACL/EACL'97 Workshop on Intelligent Scalable Text Summarization, 1997, pp. 10-17.
Bazinska, Explore Word Analogies, Available Online at: https://lamyiowce.github.io/word2viz/, Jan. 7, 2017, 2 pages.
Berkovsky et al., Influencing Individually: Fusing Personalization and Persuasion, ACM Transactions on Interactive Intelligent Systems, vol. 2, No. 2, Article 9, Jun. 2012, 8 pages.
Bernard et al., The Power of Well-Connected Arguments: Early Sensitivity to the Connective Because, Journal of Experimental Child Psychology, vol. 111, No. 1, Jan. 2012, pp. 128-135.
Bird et al., Natural Language Processing with Python, Analyzing Text with the Natural Language Toolkit, Available Online at: http://www.nltk.org/book_1ed, Jun. 2009, 504 pages.
Bolshakov et al., Synonymous Paraphrasing Using WordNet and Internet, Department of Computer Science and Engineering, Chung-Ang University, Seoul, Jan. 1970, 12 pages.
Bordes et al., Learning End-To-End Goal-Oriented Dialog, Available online at: https://arxiv.org/abs/1605.07683, Mar. 30, 2017, 15 pages.

Bridge, Towards Conversational Recommender Systems: A Dialogue Grammar Approach, Conference: 6th European Conference ov Case Based Reasoning, ECCBR 2002, Jan. 2002, pp. 9-22.
Budanitsky et al., Evaluating WordNet-Based Measures of Lexical Semantic Relatedness, Computational Linguistics, vol. 32, No. 1, Mar. 2006, pp. 13-47.
Budzianowski et al., MultiWOZ—A Large-Scale Multi-DomainWizard-of-Oz Dataset for Task-Oriented Dialogue Modelling, Proceedings of the 2018 Conference on Empirical Methods in Natural Language Processing, Oct. 31-Nov. 4, 2018, pp. 5016-5026.
Cabrio et al., A Natural Language Bipolar Argumentation Approach to Support Users in Online Debate Interactions, Argument and Computation, vol. 4, No. 3, Nov. 26, 2013, pp. 209-230.
Campbell, Chatbot Win Prize by Changing the Subject, New Scientist, vol. 208, No. 2785, Nov. 6, 2010, 1 page.
Chen et al., Critiquing-Based Recommenders: Survey and Emerging Trends, User Modeling and User-Adapted Interaction, vol. 22, Nos. 1-2, Apr. 2012, pp. 125-150.
Cheng et al., Joint Training for Pivot-Based Neural Machine Translation, Proceedings of the Twenty-Sixth International Joint Conference on Artificial Intelligence (IJCAI-17), Feb. 21, 2017, 7 pages.
Coulmance et al., Trans-Gram, Fast Cross-Lingual Word-Embeddings, Available Online at: https://arxiv.org/pdf/1601.02502.pdf, Jan. 11, 2016, 8 pages.
Crutzen et al., An Artificially Intelligent Chat Agent That Answers Adolescents' Questions Related to Sex, Drugs, and Alcohol: An Exploratory Study, Journal of Adolescent Health, vol. 48, No. 5, May 2011, pp. 1-6.
Dagan et al., Recognizing Textual Entailment: Rational, Evaluation and Approaches, Natural Language Engineering, vol. 15, No. 4, Oct. 2009, pp. i-xvii.
Dung, On the Acceptability of Arguments and Its Fundamental Role in Nonmonotonic Reasoning, Logic Programming and N-Person Games, Artificial Intelligence, vol. 77, No. 2, Sep. 1995, pp. 321-357.
Ellsworth et al., Mutaphrase: Paraphrasing with FrameNet, Proceedings of the Workshop on Textual Entailment and Paraphrasing, Available Online at: http://www.icsi.berkeley.edu/pubs/speech/acl07.pdf, Jun. 2007, pp. 143-150.
Elsner et al., You Talking to Me? A Corpus and Algorithm for Conversation Disentanglement, Proceedings of ACL-08: HLT, Jun. 2008, pp. 834-842.
European Application No. 18789298.9, Office Action dated Jan. 18, 2022, 8 pages.
Faruqui et al., Improving Vector Space Word Representations Using Multilingual Correlation, Proceedings of the 14th Conference of the European Chapter of the Association for Computational Linguistics, Apr. 26-30, 2014, pp. 462-471.
Felfernig et al., Developing Constraint-Based Recommenders, Recommender Systems Handbook, 2010, pp. 187-215.
Ferraiolo et al., Role-Based Access Controls, Proceedings of the 15th NIST-NSA National Computer Security Conference, Oct. 13-16, 1992, 11 pages.
Galitsky et al., Building Dialogue Structure from Discourse Tree of a Question, Proceedings of the 2018 EMNLP Workshop SCAI: The 2nd International Workshop on Search-Oriented Conversational AI, Oct. 31, 2018, pp. 17-23.
Galitsky et al., Building Integrated Opinion Delivery Environment, Proceedings of the Twenty-Fourth International Florida Artificial Intelligence Research Society Conference, Jan. 2011, 6 pages.
Galitsky et al., Discourse-Based Approach to Involvement of Background Knowledge for Question Answering, Proceedings of the International Conference on Recent Advances in Natural Language Processing, Sep. 2-4, 2019, pp. 373-381.
Galitsky et al., Extending Tree Kernels Towards Paragraphs, International Journal of Computational Linguistics and Applications, vol. 5, No. 1, Jan.-Jun. 2014, pp. 105-116.
Galitsky et al., From Generalization of Syntactic Parse Trees to Conceptual Graphs, Proceedings of the 18th International Conference on Conceptual structures: From Information to Intelligence, Jul. 26, 2010, pp. 185-190.

(56) References Cited

OTHER PUBLICATIONS

Galitsky, Learning Parse Structure of Paragraphs and its Applications in Search, Engineering Applications of Artificial Intelligence, vol. 32, Jun. 2014, pp. 160-184.
Galitsky, Natural Language Understanding with the Generality Feedback, Discrete Mathematics and Theoretical Computer Science Technical Report 99-32, Jun. 1999, pp. 1-21.
Galitsky et al., On a Chatbot Conducting Dialogue-in-Dialogue, Proceedings of the 20th Annual SIGdial Meeting on Discourse and Dialogue, Sep. 11-13, 2019, pp. 118-121.
Galitsky et al., On a Chatbot Conducting Virtual Dialogues, CIKM '19: Proceedings of the 28th ACM International Conference on Information and Knowledge Management, vol. 4, Nov. 3, 2019, pp. 2925-2928.
Galitsky et al., Programming Spatial Algorithms in Natural Language, Natural Language Processing, Available Online at https://www.researchgate.net/publication/255598711_Programming_Spatial_Algorithms_in_Natural_Language, Jan. 2008, pp. 16-23.
Galitsky, Providing Personalized Recommendation for Attending Events Based on Individual Interest Profiles, Artificial Intelligence Research, vol. 5, No. 1, Apr. 2016, 37 pages.
Garcia-Villalba et al., A Framework to Extract Arguments in Opinion Texts, International Journal of Cognitive Informatics and Natural Intelligence, vol. 6, No. 3, pp. 62-87, Jul.-Sep. 2012.
Glickman et al., Web Based Probabilistic Textual Entailment, Computer Science Department, Available Online at: https://citeseerx.ist.psu.edu/viewdoc/download?doi=10.1.1.125.6555&rep=rep1&type=pdf, Jan. 2005, 4 pages.
Grasso, Playing with RST: Two Algorithms for the Automated Manipulation of Discourse Trees, Text, Speech and Dialogue: Second International Workshop, TSD'99 Plzen, Czech Republic, Lecture Notes in Computer Science, vol. 1692, Sep. 1, 1999, pp. 357-360.
Greenberg, Conversational Experiences: Building Relationships One Conversation at a Time, Social CRM: The Conversation, Oct. 30, 2018, 10 pages.
Gronroos, The Relationship Marketing Process: Communication, Interaction, Dialogue, Value, Journal of Business & Industrial Marketing, vol. 19, Issue 2, Mar. 2004, pp. 99-113.
Grosz et al., Centering: A Framework for Modeling the Local Coherence of Discourse, Computational Linguistics, vol. 21, No. 2, Jan. 1995, pp. 203-225.
Hart et al., Text Classification for Data Loss Prevention, Proceedings of the 11th International Conference on Privacy Enhancing Technologies, Jul. 27-29, 2011, 21 pages.
Heerschop et al., Polarity Analysis of Texts Using Discourse Structure, In Proceedings of the 20th ACM International Conference on Information and Knowledge Management, CIKM '11, Oct. 24, 2011, 10 pages.
Hoffman, Financial Report Ontology, Available Online at: http://www.xbrlsite.com/2015/fro/, 2015, 2 pages.
Ibeke et al., Extracting and Understanding Contrastive Opinion through Topic Relevant Sentences, Proceedings of the Eighth International Joint Conference on Natural Language Processing, vol. 2, Nov. 27-Dec. 1,2017, pp. 395-400.
Ji et al., Representation Learning for Text-Level Discourse Parsing, Association for Computational Linguistics, vol. 1: Long Papers, Available Online at: https://www.aclweb.org/anthology/P14-1002, Jun. 1, 2014, pp. 13-24.
Jijkoun et al., Recognizing Textual Entailment Using Lexical Similarity, Available Online at: https://u.cs.biu.ac.il/~nlp/RTE1/Proceedings/jijkoun_and_de_rijke.pdf, Jan. 2005, 4 pages.
Johnson et al., Procedural Generation of Linguistics, Dialects, Naming Conventions and Spoken Sentences, Proceedings of 1st International Joint Conference of DiGRA and FDG, 2016, pp. 1-9.
Kan et al., Linear Segmentation and Segment Significance, Department of Computer Science and Center for Research on Information Access, Sep. 15, 1998, 9 pages.
Kelley, An Iterative Design Methodology for User-Friendly Natural Language Office Information Applications, ACM Transaction on Information Systems, vol. 2, No. 1, Mar. 1984, pp. 26-41.
Kerly et al., Bringing Chatbots into Education: Towards Natural Language Negotiation of Open Learner Models, Knowledge-Based Systems, vol. 20, No. 2, Dec. 11, 2006, 14 pages.
Koiti, Presentation on Theme: WG2 PWI24617-5 SemAF, Discourse Structure, Berlin Hasida Koiti Aist, Accessed Oct. 14, 2019, 2 pages.
Kostelnik et al., Chatbots For Enterprises: Outlook, Acta Universitatis Agriculturae ET Silviculturae Mendelianae Brunensis, vol. 67, No. 6, 2019, pp. 1541-1550.
Kuyten et al., A Discourse Search Engine based on Rhetorical Structure Theory, Advances in Information Retrieval: 37th European Conference on IR Research, Lecture Notes in Computer Science, vol. 9022. Springer, Cham., Mar. 2015, 12 pages.
Kwiatkowski et al., Natural Questions: A Benchmark for Question Answering Research, Transactions of the Association of Computational Linguistics, 2019, 14 pages.
Li et al., DailyDialog: A Manually Labelled Multi-Turn Dialogue Dataset, Proceedings of the Eighth International Joint Conference on Natural Language Processing, Long Papers, vol. 1, Dec. 1, 2017, pp. 986-995.
Lioma et al., Rhetorical Relations for Information Retrieval, Proceedings of the 35th international ACM SIGIR conference on Research and Development in Information Retrieval. Association for Computing Machinery, Aug. 12-16, 2012, pp. 931-940.
Lippi et al., Argument Mining from Speech: Detecting Claims in Political Debates, AAAI'16: Proceedings of the Thirtieth AAAI Conference on Artificial Intelligence, Feb. 2016, pp. 2979-2985.
Logacheva et al., ConvAI Dataset of Topic-Oriented Human-to-Chatbot Dialogues, The NIPS '17 Competition: Building Intelligent Systems, 2018, pp. 47-57.
Louis et al., Discourse Indicators for Content Selection in Summaization, SIGDIAL Conference, The Association for Computer Linguistics, Sep. 2010, pp. 147-156.
Lowe et al., On the Evaluation of Dialogue Systems with Next Utterance Classification, Proceedings of the 17th Annual Meeting of the Special Interest Group on Discourse and Dialogue, Sep. 13-15, 2016, pp. 264-269.
Lucas, Computer-Assisted Text Analysis for Comparative Politics, Political Analysis, vol. 23 , No. 2, Feb. 4, 2015, pp. 254-277.
Makhalova et al., Information Retrieval Chatbots Based on Conceptual Models, In book: Graph-Based Representation and Reasoning, Jun. 2019, pp. 230-238.
Marir et al., Rhetorical Structure Theory for Content-Based Indexing and Retrieval of Web Documents, ITRE 2004, 2nd International Conference Information Technology: Research and Education, Jun. 28-Jul. 1, 2004, pp. 160-164.
Marks et al., Want Classified Information? Talk to The Chatbot, New Scientist, vol. 223, No. 2980, Aug. 2, 2014, p. 22.
Mathkoura Novel Rhetorical Structure Approach for Classifying Arabic Security Documents, International Journal of Computer Theory and Engineering, vol. 1, No. 3, Aug. 2009, pp. 195-200.
Matousek et al., Text, Speech and Dialogue, Second International Workshop, TSD'99 Plzen, Czech Republic, Sep. 13-17, 1999, 11 pages.
Miceli et al., Emotional and Non-Emotional Persuasion, Applied Artificial Intelligence, Jun. 2006, pp. 1-25.
Mikolov et al., Efficient Estimation of Word Representations in Vector Space, Available Online at: https://arxiv.org/pdf/1301.3781.pdf, Sep. 7, 2013, pp. 1-12.
Miyabe et al., Identifying a Cross-Document Relation Between Sentences, IPSJ SIG Technical Reports, Information Processing Society of Japan, vol. 2005, No. 73, Jul. 2005, 11 pages.
Morato et al., Experiments in Discourse Analysis Impact on Information Classification and Retrieval Algorithms, Information Processing and Management, vol. 39, No. 6, Nov. 2003, pp. 825-851.
Murphy et al., What Makes a Text Persuasive? Comparing Students' and Experts' Conceptions of Persuasiveness, International Journal of Educational Research, vol. 35, pp. 675-698, 2001.

(56) References Cited

OTHER PUBLICATIONS

Narducci et al., Improving the User Experience with a Conversational Recommender System, International Conference of the Italian Association for Artificial Intelligence, Nov. 2018, pp. 528-538.
Nguyen et al., A Neural Local Coherence Model, Proceedings of the 55th Annual Meeting of the Association for Computational Linguistics, vol. 1, Long papers, Jul. 2017, pp. 1320-1330.
International Application No. PCT/US2018/053376, International Preliminary Report on Patentability dated Apr. 9, 2020, 12 pages.
International Application No. PCT/US2018/053376, International Search Report and Written Opinion dated Feb. 11, 2019, 18 pages.
International Application No. PCT/US2018/053376 Invitation to Pay Additional Fees and Partial Search Report, dated Dec. 21, 2018, 11 pages.
International Application No. PCT/US2019/031580, International Preliminary Report on Patentability dated Nov. 19, 2020, 8 pages.
International Application No. PCT/US2019/031580, International Search Report and Written Opinion dated Jul. 5, 2019, 12 pages.
Pennington et al., GloVe: Global Vectors for Word Representation, Proceedings of the 2014 Conference on Empirical Methods in Natural Language Processing (EMNLP), Oct. 25-29, 2014, pp. 1532-1543.
Poesio et al., Centering: A Parametric Theory and Its Instantiations, Computational Linguistics, vol. 30, No. 3, Sep. 1, 2004, pp. 309-363.
Rajpurkar et al., Know What You Don't Know: Unanswerable Questions for SQuAD, arXiv:1806.03822, Available Online at: https://arxiv.org/pdf/1806.03822.pdf, Jun. 11, 2018, 9 pages.
Rajpurkar et al., SQuAD: 100,000+ Questions for Machine Comprehension of Text, Proceedings of the Conference on Empirical Methods in Natural Language Processing, Available online at: https://doi.org/10.18653/v1/D16-1264, Oct. 11, 2016, pp. 2383-2392.
Ritter et al., Data-Driven Response Generation in Social Media, Proceedings of the 2011 Conference on Empirical Methods in Natural Language Processing, Jul. 27-31, 2011, pp. 583-593.
Rose et al., Discourse Processing of Dialogues with Multiple Threads, In Proceedings of the 33rd Annual Meeting of the Association for Computational Linguistics, Jun. 26-30, 1995, pp. 31-38.
Ruder, An Overview of Gradient Descent Optimization Algorithms, Available Online at: https://arxiv.org/pdf/1609.04747.pdf, Jun. 15, 2017, 14 pages.
Sakai, Alternatives to Bpref, Proceedings of the 30th Annual International ACM SIGIR Conference on Research and Development in Information Retrieval, Jul. 2007, pp. 71-78.
Schlosser, Can Including Pros and Cons Increase the Helpfulness and Persuasiveness of Online Reviews? The Interactive Effects of Ratings and Arguments, Journal of Consumer Psychology, vol. 21, No. 3, Jul. 2011, pp. 226-239.
Schnabel et al., Evaluation Methods for Unsupervised Word Embeddings, Proceedings of the 2015 Conference on Empirical Methods in Natural Language Processing, Available Online at: https://www.aclweb.org/anthology/D15-1036.pdf, Sep. 17-21, 2015, pp. 298-307.
Schulz et al., A Frame Tracking Model for Memory-Enhanced Dialogue Systems, Available Online at: https://arxiv.org/pdf/1706.01690.pdf, Jun. 6, 2017, 9 pages.
Selivanov, GloVe Word Embeddings, Available Online at: https://cran.rproject.org/web/packages/text2vec/vignettes/glove.html, Feb. 18, 2020, 4 pages.
Seo et al., Online Community Search Using Thread Structure, In Proceedings of the 18th ACM Conference on Information and Knowledge Management, Nov. 2009, 4 pages.
Shaw, 3 Reasons Why People Say One Thing and Do Another, Available online at: https://beyondphilosophy.com/3-reasons-why-people-say-one-thing-and-do-another/, May 22, 2015, 7 pages.
Sidorov et al., Syntactic N-Grams as Machine Learning Features for Natural Language Processing, Expert Systems with Applications, vol. 41, No. 3, Feb. 15, 2014, pp. 853-860.
Somasundaran et al., Supervised and Unsupervised Methods in Employing Discourse Relations for Improving Opinion Polarity Classification, Proceedings of the 2009 Conference on Empirical Methods in Natural Language Processing: vol. 1—vol. 1, In EMNLP, ACL, Aug. 2009, pp. 170-179.
Soricut et al., Sentence Level Discourse Parsing using Syntactic and Lexical Information, NAACL '03: Proceedings of the 2003 Conference of the North American Chapter of the Association for Computational Linguistics on Human Language Technology—vol. 1, Available Online at: https://www.aclweb.org/anthology/J02-4002, May 27, 2003, pp. 149-156.
Sun et al., Conversational Recommender System, Available Online at https://arxiv.org/pdf/1806.03277.pdf, Jun. 8, 2018, 10 pages.
Sun et al., Discourse Processing for Context Question Answering Based on Linguistic Knowledge, Knowledge-Based System, vol. 20, No. 6, Aug. 1, 2007, pp. 1-23.
Suwandaratna et al., Discourse Marker Based Topic Identification and Search Results Refining, In Information and Automation for Sustainability (ICIAFs), 5th International Conference, 2010, pp. 119-125.
Teufel et al., Summarizing Scientific Articles: Experiments with Relevance and Rhetorical Status, Computational Linguistics, vol. 28, No. 4, Dec. 2002, pp. 409-445.
Thompson et al., A Personalized System for Conversational Recommendations, Journal of Artificial Intelligence Research, vol. 21, No. 1, Mar. 2004, pp. 393-428.
Tseng et al., Tree-Structured Semantic Encoder with Knowledge Sharing for Domain Adaptation in Natural Language Generation, Available Online at: https://arxiv.org/pdf/1910.06719.pdf, Oct. 2, 2019, 10 pages.
Venkatesh et al., On Evaluating and Comparing Conversational Agents, 31st Conference on Neural Information Processing Systems, Jan. 2018, 10 pages.
Vorontsov et al., Additive Regularization of Topic Models, Machine Learning, vol. 101, No. 1-3, Oct. 2015, 21 pages.
Walia et al., Semantic Features for Automated Answer Scoring, International Journal if Advance Research in Science and Engineering, vol. 6, No. 10, Oct. 24, 2017, 6 pages.
Wang et al., A Simple and Generic Belief Tracking Mechanism for the Dialog State Tracking Challenge: On the Believability of Observed Information, Proceedings of the SIGDIAL 2013 Conference, Aug. 22-24, 2013, pp. 423-432.
Wang et al., An Information Retrieval Approach Based on Discourse Type, Proceedings of the 11th International Conference on Applications of Natural Language to Information Systems, May 2006, pp. 197-202.
Wang et al., Predicting Thread Discourse Structure over Technical Web Forums, Proceedings of the 2011 Conference on Empirical Methods in Natural Language Processing, Jul. 27, 2011, pp. 13-25.
Wolf et al., Representing Discourse Coherence: A Corpus-Based Study, Computational Linguistics, vol. 31, No. 2, Jun. 2005, pp. 134-140.
Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, 10 pages.
Young et al., POMDP-Based Statistical Spoken Dialogue Systems: A Review, Proceedings of the IEEE, vol. 101, No. 5, Jan. 9, 2013, pp. 1160-1179.
Yu et al., Detecting User Engagement in Everyday Conversations, Available online at: https://arxiv.org/pdf/cs/0410027.pdf, Oct. 13, 2004, 4 pages.
Zeilenga, Lightweight Directory Access Protocol (LDAP) Read Entry Controls, Standards Track, Network Working Group, IETF, RFC 4527, Jun. 2006, 8 pages.
Zhao et al., Application-Driven Statistical Paraphrase Generation, Proceedings of the 47th Annual Meeting of the ACL and the 4th IJCNLP of the AFNLP, Aug. 2-7, 2009, pp. 834-842.
Zhao et al., Joint Syntacto-Discourse Parsing and the Syntacto-Discourse Treebank, Oregon State University, Available online at:

(56) References Cited

OTHER PUBLICATIONS https://arxiv.org/pdf/1708.08484.pdf, Aug. 28, 2017, pp. 2117-2123.

* cited by examiner

AUGMENTING TEXTUAL EXPLANATIONS WITH COMPLETE DISCOURSE TREES

CROSS-REFERENCE TO RELATED APPLICATIONS

This non-provisional application claims priority to U.S. Patent Application No. 62/924,360, filed on Oct. 22, 2019, the disclosure of which is herein incorporated by reference in its entirety for all purposes.

TECHNICAL FIELD

This disclosure is generally concerned with linguistics. More specifically, this disclosure relates to using communicative discourse trees to perform discourse analysis.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

DETAILED DESCRIPTION

Figure 1:
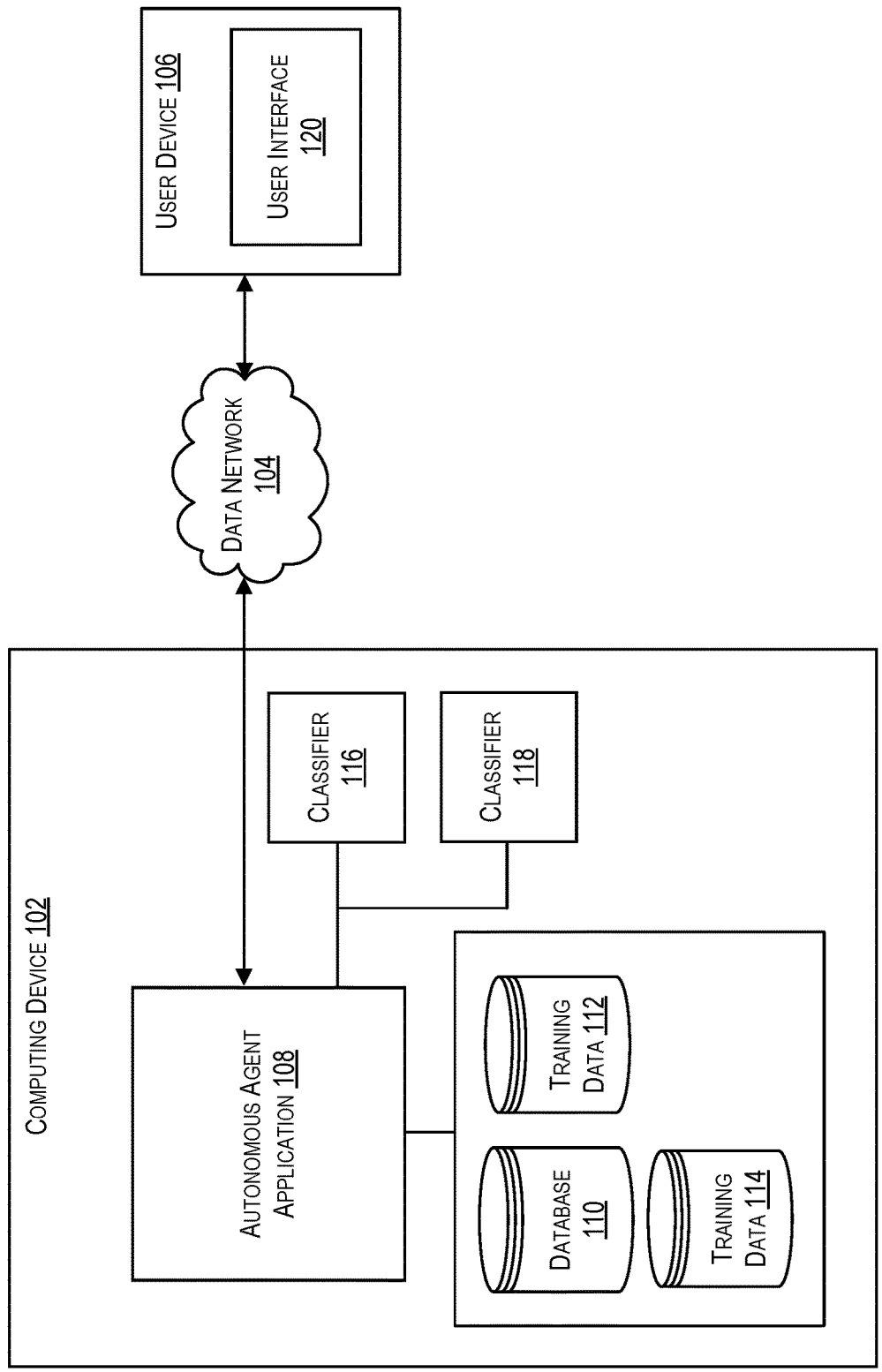
FIG. 1 depicts an autonomous agent environment, in accordance with at least one embodiment.

Aspects of the present disclosure relate to validating a soundness of textual explanations in a domain-independent manner. For text to have a proper explanation, a presence of a logical chain between entities in the explanation is necessary but is not sufficient. Additionally, a proper rhetorical structure is needed. Accordingly, certain aspects determine that two text statements have both (1) a logical connection and (2) a rhetorical connection. Text that meets these criteria includes better explanations than sentences that do not meet these criteria. The following example is provided for illustrative purposes:

"Drinking dirty water is bad. Dirty water has bacteria. Bacteria has disease."

As can be seen, while the above sentences are logically connected (drinking dirty water is bad because dirty water→bacteria→disease→bad), the sentences are not rhetorically connected in such a manner that the explanation becomes believable, because the sentences are simply statements of fact.

Using discourse trees, disclosed techniques can determine whether a set of sentences as provided above contain a suitably proper explanation. Discourse trees can assist in the analysis of an explanation. For example, with suitable discourse markers, discourse trees generated from the text include rhetorical relationships that are beyond a simple "explanation" rhetorical relation. In some cases, sentences that are verified by using the techniques described herein are used to train a machine learning model to improve an autonomous agent (chatbot) or to verify whether an explanation provided to a user is acceptable.

Certain aspects of the disclosure include generating "complete discourse trees" (complete DT). Complete DTs may be utilized to determine an acceptability of an explanation to be provided by an autonomous agent. A "complete DT," as used herein, is intended to refer to a sum of a traditional discousre tree (DT) for a portion (e.g., a paragraph) of text and an imaginary DT for text corresponding to various entities that are used but not explicitly defined in the actual text. Thus, the imaginary DT content cannot be produced from text as parsing results.

Providing explanations of decisions for human users, and understanding how human agents explain their decisions, are features of intelligent decision making and decision support systems. A number of complex forms of human behavior is associated with attempts to provide acceptable and convincing explanations. Presentation of knowledge in dialogue format is a popular way to communicate information effectively. It has been demonstrated in games, news, commercials, and educational entertainment. Usability studies have shown that for information acquirers, dialogues often communicate information more effectively than monologue most of times. If an autonomous agent provides an explanation to a user that is not convincing, the user can lose faith in the answers provided by the autonomous agent. Thus, a computational framework for assessing soundness of explanations to be provided by an autonomous agent is much needed. Importance of the explanation-aware computing has been demonstrated in multiple studies and systems. The field of explanation-aware computing is now actively contributing to such areas as legal reasoning, natural language processing and also multi-agent systems.

Explanations are correlated with argumentation and sentiments. A request to explain is usually associated with certain arguments and a negative sentiment. For an arbitrary statement S, a person may have little or no prior reason for believing this statement to be true. In this case a cognitive response is a doubt, which is articulated with a request for evidence. Evidence is a kind of reason, and the attempt to provide evidence in support of a conclusion is normally called an argument. On the other hand a person may already know S and require no further evidence for the truth of S. But she still may not understand why S holds (occurred, happened etc.). In this case she would request a cause. Explanation is defined as an attempt to provide a cause in support of a conclusion.

The disclosed techniques are directed to how to computationally differentiate good explanations in text from bad explanations. Intuitively, a good explanation convinces the addressee that a communicated claim is right, and it involves valid argumentation patterns, and is logical, complete and thorough. A bad explanation is unconvincing, detached from the beliefs of the addressee, includes flawed argumentation patterns, and/or omits necessary entities. In some embodiments, good and bad explanations may be differentiated from one another based on a human response to such explanation. Whereas users are satisfied with good explanation, bad explanations usually lead to dissatisfactions, embarrassment and complaints.

FIG. 1 depicts autonomous agent environment 100, in accordance with at least one embodiment.

FIG. 1 depicts computing device 102, data network 104, and user device 106. Computing device 102 includes one or more of autonomous agent application 108, database 110, training data 112, training data 114, classifier 116, and classifier 118. User device 106 may include user interface 120.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

In an example, autonomous agent application 108 receives one or more questions from user device 106. Autonomous agent application 108 analyzes the question, formulates a response, and provides the response to the user device 106 at user interface 120. In some aspects, machine learning is used by the autonomous agent application 108 to generate dialog based on a received query. For example, computing device 102 can include classifier 118. Classifier 118 can be trained using training data 114 (e.g., previous questions for which corresponding answers are known). Examples of classifier 118 include predictive models, classification models, neural networks, and so on. In some embodiments, classifier 118 may be trained utilizing any suitable supervised learning algorithm in which a function (e.g., a model) is trained to identify an answer (e.g., output) for a provided question (e.g., input) based at least in part on a set of questions for which answers are already known (e.g., a training set comprising input-output pairs). In some embodiments, the set of questions and their corresponding answers may be each in the form of a discourse tree.

In some embodiments, the autonomous agent application 108 may be configured to evaluate/validate the soundness of answers within the training data 114 that include explanations. By way of example, the autonomous agent application 108 may be configured to identify answers that include explanations. In some embodiments, the autonomous agent application 108 may utilize a predetermined protocol set (e.g., a rule set) for identifying answers of training data 114 that include explanations. In some embodiments, the autonomous agent application 108 may utilize classifier 116 (e.g., a function, a model, etc.) that has been previously trained to identify whether a provided answer includes an explanation. The classifier 116 may take an answer as input and output a determination that either 1) the answer includes an explanation or 2) the answer does not include an explanation. The classifier 116 may be previously trained using training data 112 that includes a set of answers that include explanations. In some embodiments, training data 112 may further include a set of answers that do not include explanations. The autonomous agent application 108 may be configured to execute any suitable supervised learning algorithm against the training data 112 to train the classifier 116 to identify explanations from inputted answers obtained from training data 114. In some embodiments, the autonomous agent application 108 need not actually train the classifier 116. Rather, in some cases, the autonomous agent application 108 may obtain classifier 116 from another system (not depicted) which may have previously trained the classifier 116 in the manner described above.

In some embodiments, the autonomous agent application 108 may provide each answer within the training data 114 as input to the classifier 116. Classifier 116, in turn, may classify each answer as 1) including an explanation or 2) not including an explanation. For the set of answers identified as including explanations, the autonomous agent application 108 may be configured to validate whether the explanation is good (e.g., complete) or bad (e.g., incomplete) utilizing the methods discussed below in connection with FIGS. 2-5. If the explanation is bad (e.g., incomplete), the autonomous agent application 108 may be configured to perform operations to improve the explanation (e.g., augment the explanation) utilizing the techniques described below.

The training data 114 (including any suitable number of augmented explanations) may be utilized to train the classifier 118 as described above to identify an answer in response to a provided question. In some embodiments, improving the training data 114 via the techniques described herein improve the explanations provided by augmenting the explanation with missing logical connections. This makes it more likely that the user is provided a sensical answer/explanation and increases the likelihood that the user believes the answer and trusts the autonomous agent application 108.

Figure 2:
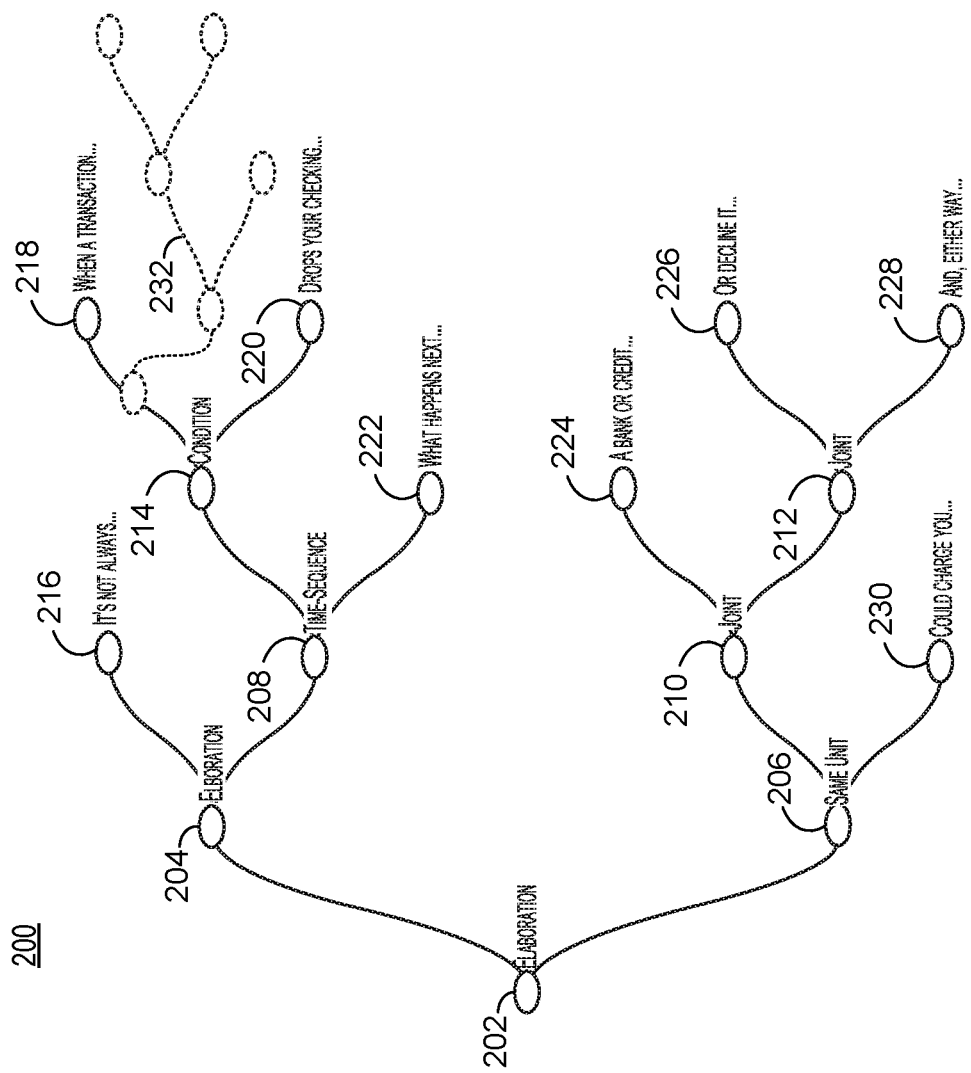
FIG. 2 depicts an example complete discourse tree of an example paragraph, in accordance with at least one embodiment.

FIG. 2 depicts an example discourse tree 200 of an example explanation, in accordance with at least one embodiment.

Arcs of the discourse tree 200 correspond to rhetorical relations (RR), connecting text blocks called Elementary Discourse Units (EDU). In some embodiments, the discourse tree 200 is generated based at least in part on Rhetorical Structure Theory (RST, Mann and Thompson, 1988) and describes the discourse structure of the example explanation below. Each node in the discourse tree (e.g., nodes 202-214) corresponds to a rhetorical relationship between two portions of text corresponding each child node. The leaves (e.g., leaves 216-230) of discourse tree 200 each correspond to a particular portion of the text.

The example paragraph below provides an informal explanation in the banking domain. In the banking domain nonsufficient fund fee (NSF) is a major problem that banks have difficulties communicating with customers. The explanation includes the following:

It's not always easy to understand overdraft fees. When a transaction drops your checking account balance below zero, what happens next is up to your bank. A bank or credit union might pay for the transaction or decline it and, either way, could charge you a fee.

The concept of transaction is not addressed in this text explaining overdraft fees. An ontology could specify that transaction ={wiring, purchasing, sending money} but such an ontology is difficult to complete. Instead, one can complement the notion of transaction via additional text that will elaborate on transaction, providing more details on it.

When people explain concepts or ideas, they do not have to enumerate all premises: some of them implicitly occurring in the explanation chain and are assumed by the person providing explanation to be known or believed by an addressee. However, a DT for a text containing an explanation only includes EDUs from actual text and assumed, implicit parts with its entities and phrases (which are supposed to enter explanation sequence) are absent.

In the example provided in FIG. 2, an Elaboration relation for nucleus transaction (e.g., depicted by sub-tree 232) is not originally in the discourse tree 200 but is likely assumed by a recipient of this explanation text. Such rhetorical relations may be referred to as "imaginary" as they are not produced from text but are instead induced by the context of explanation. Such multiple imaginary RRs can be generated to form additional nodes of the discourse tree 200. The discourse tree 200 of FIG. 2 may be considered complete as it combines the actual DT (e.g., discourse tree 200) and its imaginary part (e.g., sub-tree 232). Complete discourse trees can also have communicative actions attached to their edges in the form of VerbNet verb signatures (not depicted).

Figure 3:
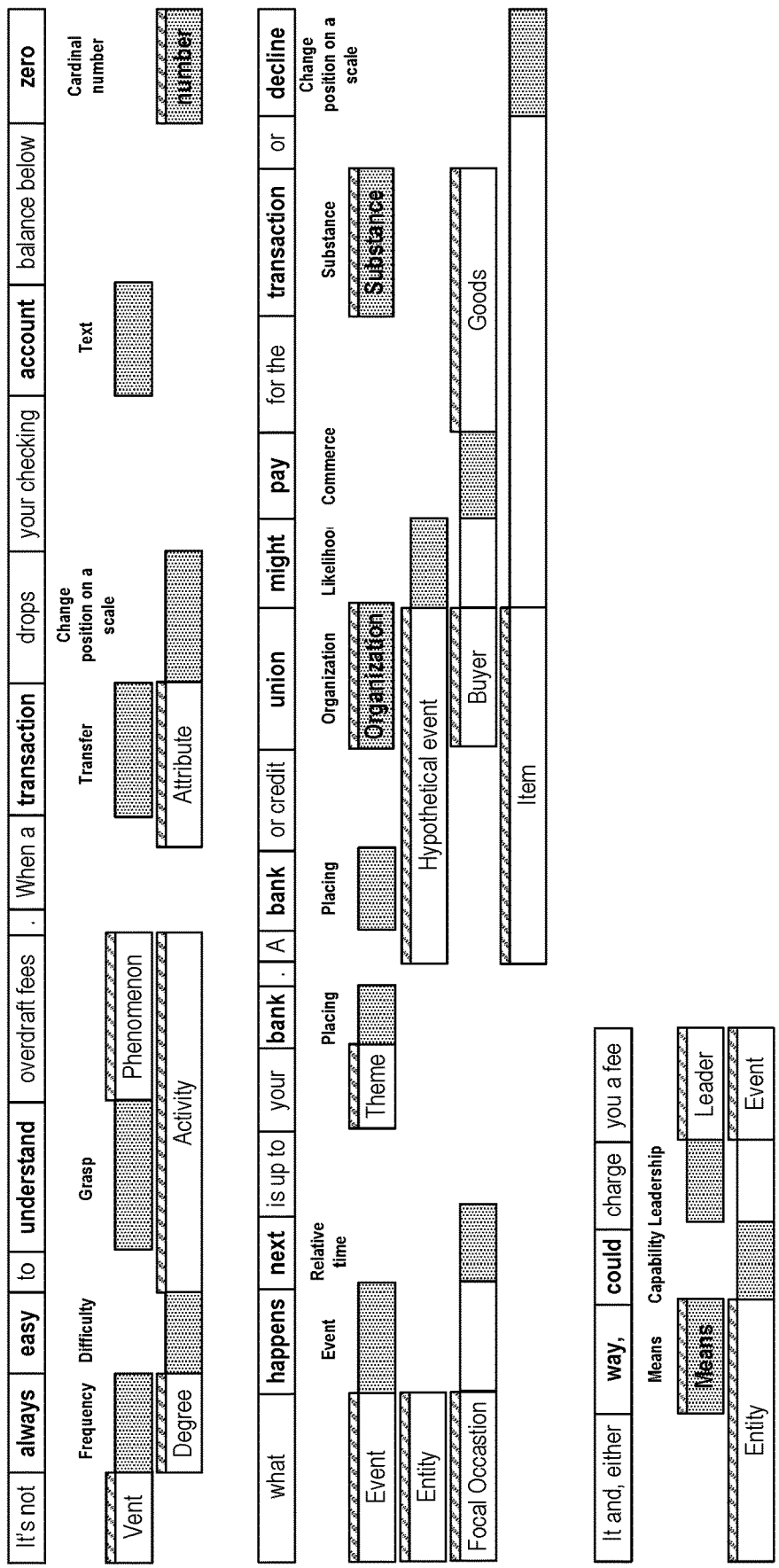
FIG. 3 depicts an example semantic parse of the example paragraph corresponding to FIG. 2, in accordance with at least one embodiment.

FIG. 3 depicts an example semantic parse of the example explanation corresponding to FIG. 2, in accordance with at least one embodiment.

A frame semantic parse for the same text is shown in FIG. 3. It is difficult, using a semantic parse to tag entities and determine context properly. Bank is tagged as Placing (not disambiguated properly) and 'credit union might' is determined as a hypothetical event since union is represented literally, as an organization, separately from credit. Overall, the main expression being explained, 'transaction drops your checking account balance below zero', is not represented as a cause of a problem by semantic analysis, since a higher level considerations involving a banking-related ontology would be required. FIG. 3 illustrates that attempting to classify explanations using a semantic parse would be ineffective. In contrast, the discourse tree 200 appears to be more suitable to classifying explanations.

Figure 4A:
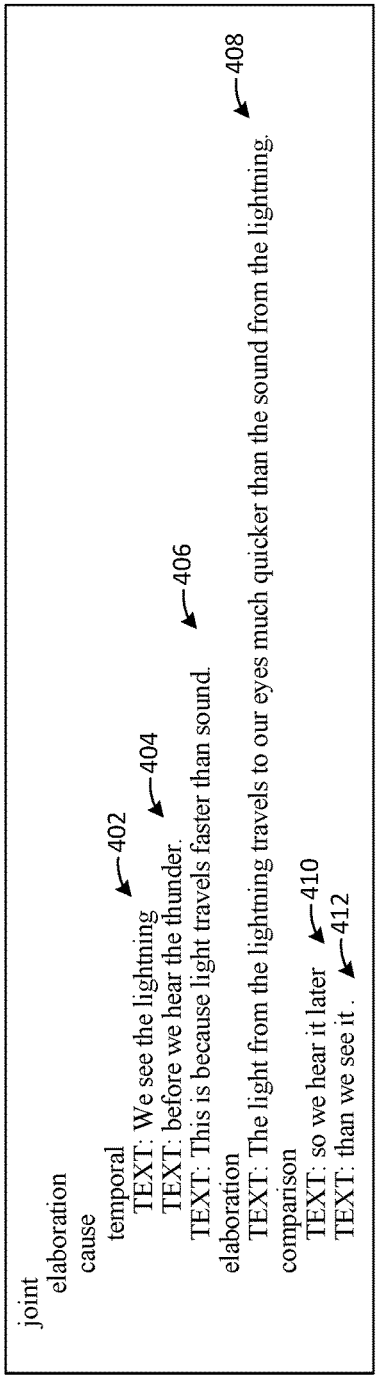
FIG. 4A depicts an example discourse tree from which an explanation chain may be generated, in accordance with at least one embodiment.

FIG. 4A depicts another visualization of an example discourse tree (e.g., discourse tree 400) from which an explanation chain may be generated, in accordance with at least one embodiment.

Valid explanations in text follow certain rhetoric patterns. In addition to default relations of Elaborations, valid explanation relies on Cause, Condition, and domain-specific Comparison. An example explanation for why thunder sound comes after lightning is provided below:

'We see the lightning before we hear the thunder. This is because light travels faster than sound. The light from the lightning comes to our eyes much quicker than the sound from the lightning. So we hear it later than we see it.'

Discourse tree 400 may be generated for the explanation above. Indentation for each line shows the tree hierarchy.

Logically, an explanation within text S may include a chain of premises $P_1, \ldots, P_m$ which imply S. The chain of $P_1, \ldots, P_m$ may be referred to as "an explanation chain." S may be referred to as a subject of the explanation. For this explanation chain $P_1, \ldots, P_m$ each element $P_i$ is implied by its predecessors: $P_1, \ldots P_{i-1} \Rightarrow P_i$. In terms of a discourse tree, there should be a path in it where these implications are realized via rhetorical relations. A mapping may be defined between Elementary Discourse Units (EDUs) of a DT and entities $P_i$ occurring in these EDUs which can be used to form the explanation chain for the text. In terms on underlying text, $P_i$ are entities which can be represented as logical atoms or terms.

These implication-focused rhetorical relations (RR) may include:
1) elaboration: where $P_i$ can be an elaboration of $P_{i-1}$;
2) attribution: where $P_i$ can be attributed to $P_{i-1}$;
3) cause: this is a most straightforward case, where $P_i \Rightarrow P_j$ if RR (EDU$_i$, EDU$_j$) where $P_i \in$ EDU$_i$ and $P_j \in$ EDU$_j$. This condition can be referred to as "explainability" via Discourse Tree.

The actual sequence $P_1, \ldots, P_m$ for S is not known, but for each S we have a set of good explanations $P_{g1}, \ldots, P_{gm}$ and a set of bad explanations $P_{b1}, \ldots, P_{b2}$. Good explanation chains obey the explainability via DT condition and bad explanation chains do not. Bad explanation chains might obey the explainability via DT condition for some $P_{bi}$. If a DT for a text is such that explainability via DT condition does not hold for any $P_{bi}$ then this DT does not include any explanation at all.

Each fragment of text (e.g., fragments 402-412) may be characterized as differing premises and an explanation chain may be generated from the premises of the body of text according to predefined rules. In some embodiments, the explanation chain may be analyzed to determine missing premises (e.g., identifying when an entity such as a noun ("lightning") lacks a logical connection to the entity such as another noun ("light"), identifying that the entity "thunder" lacks a logical connection to the entity "sound," etc.).

One missing premise may correspond to a lack of logical connection between "quicker" and "later." Said another way, an implication is missing between a verb-group-for-moving {moves, travels, comes} faster→verb-group-for-moving-result {earlier}. This clause can be easily obtained by web mining, searching for expression "if noun verb-group-for-moving faster then noun verb-group-for-moving-result earlier."

In some embodiments, each missing premise may be identified by determining all entities Y in the explanation chain which do not occur in expression 'Z because of Y, Y because of X'. If any of these premises (which correspond to fragments of text) are missing, they can be acquired via an imaginary DT.

For example, consider an explanation of text S is a chain of premises $P_1, \ldots, P_m$ which imply S. Each premise $P_i$ contains just a single entity corresponding to a text fragment. The set of premises can be represented as a sequence of text fragments. '$P_m$ because of $P_m=1, \ldots P_{i+1}$ because of $P_i$, $P_i$ because of $P_{i-1}, \ldots, P_{i-1}$ because of $P_{i-2}$'. For each missing premise, an imaginary DT may be generated.

In some embodiments, the autonomous agent application 108 of FIG. 1 may be configured to identify text corresponding to each missing premise with which the discourse tree may be augmented. One example method is provided in FIG. 5.

Figure 4B:
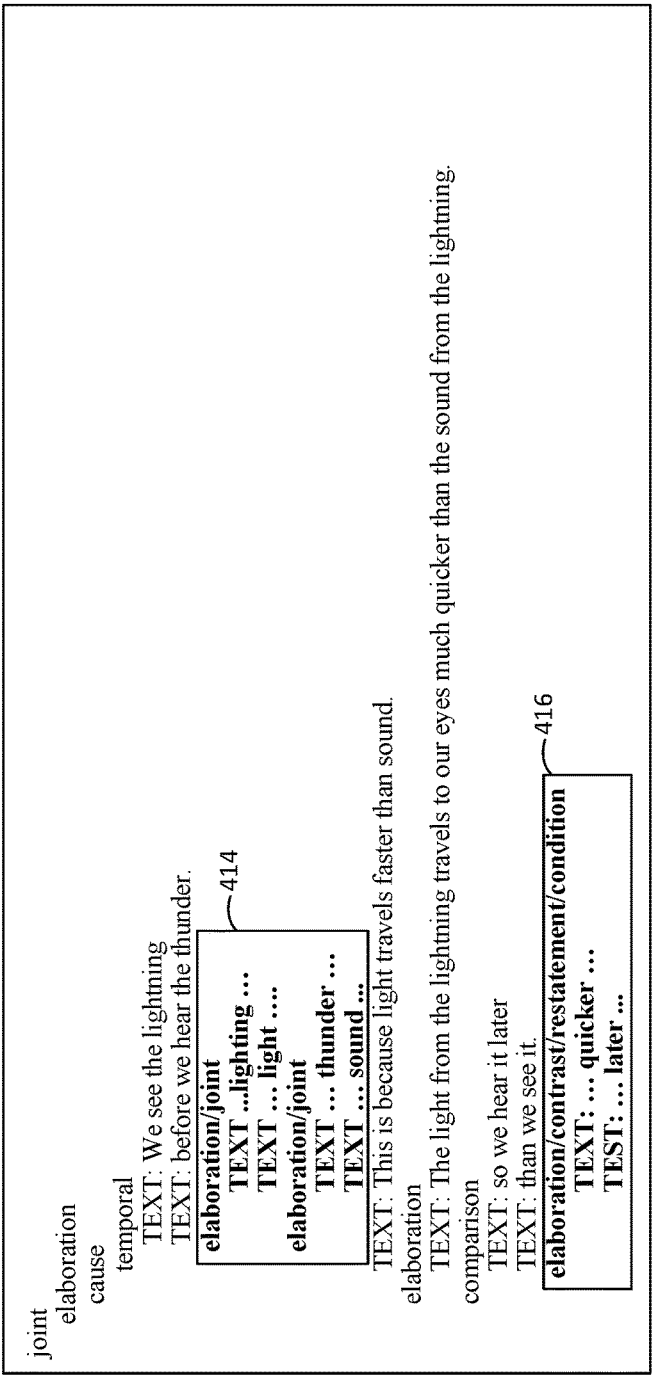
FIG. 4B depicts an example complete discourse tree corresponding to the discourse tree of FIG. 4A, in accordance with at least one embodiment.

FIG. 4B depicts an example complete discourse tree corresponding to the discourse tree of FIG. 4A, in accordance with at least one embodiment. Portions 414 and 416 are intended to relate to an imaginary discourse tree that has been generated for the missing premises of the discourse tree of FIG. 4A. In some embodiments, the imaginary discourse tree portions may be obtained, as disclosed herein, by utilizing a query (e.g., against an online search database, against a corpus of documents, etc.) to generate search results from which these imaginary discourse tree portions may be mined/obtained. The discourse tree of FIG. 4A and the imaginary discourse tree portions corresponding to the missing premises of FIG. 4A may be combined to form the complete discourse tree depicted in FIG. 4B.

Figure 5:
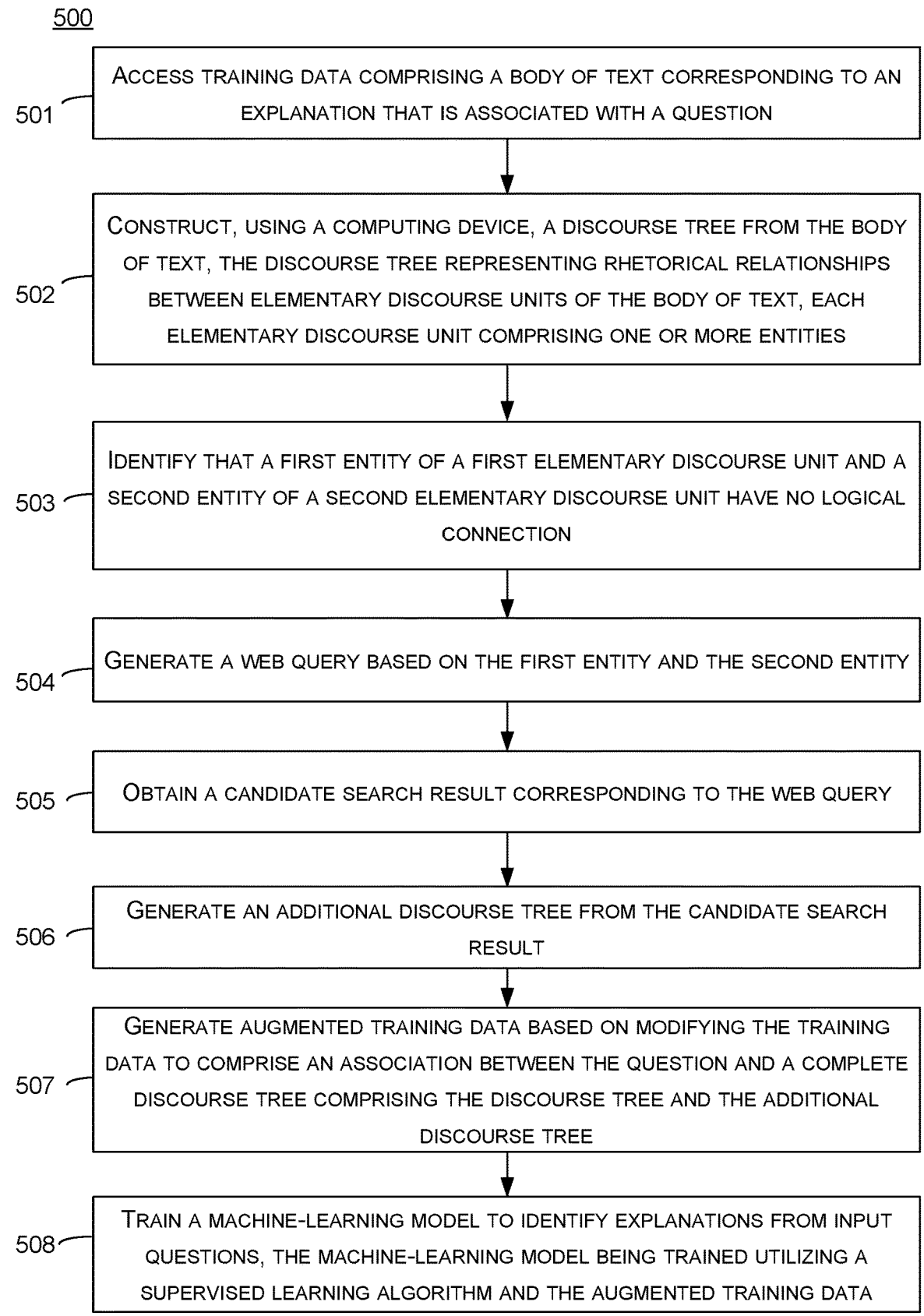
FIG. 5 illustrates an exemplary method for generating augmented training data for a machine learning model, in accordance with at least one embodiment.

FIG. 5 illustrates an exemplary method for generated augmented training data for a machine-learning model (e.g., the classifier 118 of FIG. 1), in accordance with at least one embodiment. Method 500 can be performed by a computing device (e.g., the computing device 102 of FIG. 1). In some embodiments, the method 500 may be performed by an autonomous agent application 108 of FIG. 1. In some embodiments, computing device 102 need not execute autonomous agent application 108. Rather, the autonomous agent application 108 could run on a separate device configured to access the augmented training data generated by the computing device using the method 500.

Method 500 may begin at block 501, where training data (e.g., training data 114) may be accessed. The training data may comprise a question and a body of text corresponding to an explanation associated with the question. In some embodiments, the training data can comprise any suitable number of questions associated with corresponding explanations that individually include a body of text.

At 502, a discourse tree may be constructed from the body of text. In some embodiments, the discourse tree may represent rhetorical relationships between elementary discourse units of the body of text. An elementary discourse unit may correspond to a leaf node (e.g., any one of leaves 216-230 of FIG. 2) of a discourse tree (e.g., discourse tree 200 of FIG. 2). In some embodiments, each elementary discourse unit may comprise one or more entities (e.g., nouns, verbs, phrases, etc.).

At 503, it may be identified that a first entity of a first elementary discourse unit (e.g., a noun, verb, phrase, etc.) and a second entity of a second elementary discourse unit (e.g., a noun, verb, phrase, etc.) have no logical connection. By way of example, as described above in connection with FIG. 4, an explanation chain may be generated from the elementary discourse units of the body of text. In some embodiments, the explanation chain may include premises corresponding to the EDUs and indications of logical connections between the EDUs. Using the explanation chain, the computing device can determine that the first entity of a first elementary discourse unit and a second entity of a second elementary discourse unit have no logical connection based on determining that a premise is missing that links the first entity to the second entity.

At 504, a query may be generated based on the first entity and the second entity. By way of example, one example query may be "if noun verb-group-for-moving faster then noun verb-group-for-moving-result earlier." A query, as used herein, may be a web query, a search query used against a corpus of documents, and the like.

At 505, a candidate search result corresponding to the web query may be obtained. In some embodiments, multiple candidate search results may be identified in response to executing the web query (e.g., by a web search engine). In some embodiments, a set of discourse trees may be generated corresponding to each of the set of candidate search results. A subset of the set of discourse trees may be identified that indicate a logical relationship that links the first fragment and the second fragment within the explanation chain. Each of the subset of the set of discourse trees may be scored based on a degree of relevancy between each candidate search result and the question. In some embodiments, the candidate search result may be obtained when the discourse tree corresponding to the candidate search results is selected based on its score.

At 506, an additional discourse tree (e.g., sometimes referred to above as an imaginary discourse tree) may be generated from the candidate search result.

At 507, augmented training data may be generated based on modifying the training data to comprise an association between the question and a complete discourse tree comprising the discourse tree and the additional discourse tree. In some embodiments, the complete discourse tree may be generated by combining the discourse tree and the additional discourse tree (e.g., an imaginary discourse tree that is obtained, not through parsing the original text, but by mining search data).

At 508, a machine-learning model (e.g., classifier 118 of FIG. 1) may be trained to identify explanations from input questions. In some embodiments, the machine-learning model may be trained utilizing a supervised learning algorithm and the augmented training data.

As a non-limiting example, imaginary DTs may be built on demand to augment the DTs built from the actual text. By way of example, a given chain $P_1, \ldots, P_i', \ldots, P_m$ let $P_i'$ be the entity which is not explicitly mentioned in a text but instead is assumed to be known to the addressee. To make the explainability via DT condition applicable, the actual $DT_{actual}$ can be augmented with imaginary $DT_{imaginary}$ such that $P_i' \in EDU$ of this $DT_{imaginary}$. We denote $DT_{actual}$ $DT_{imaginary}$ as $DT_{complete}$. If textual explanations are provided in the positive set of good explanations for the same S, $T_1$ and $T_2$:

$$T_1 : P_1, \ldots, P_m \Rightarrow S$$

$$T_2 : P_1', \ldots, P_m \Rightarrow S$$

then it can be assumed that $P_i'$ should occur in a complete explanation for S and since it does not occur in $T_1$ then $DT(T_1)$ should be augmented with $DT_{imaginary}$ such that $P_i' \in EDU$ of this $DT_{imaginary}$.

It should be appreciated that, in some embodiments, the techniques discussed above may be utilized to classify explanations as being either "complete" or "incomplete." For example, in some embodiments, a body of text corresponding to an explanation may be accessed. A discourse tree may be generated from the body of text (e.g., using rhetorical structure theory). An explanation chain may be generated from the discourse tree's elementary discourse units (e.g., leaves of the discourse tree). In some embodiments, the explanation may be classified as "complete" when there are no missing logical connections between the premises of the explanation corresponding to the EDUs of the discourse tree. Alternatively, the explanation may be classified as "incomplete" when there are missing logical connections between the premises of the explanation corresponding to the EDUs of the discourse tree. Thus, these techniques can be utilized to evaluate the quality of a set of one or more explanations.

Figure 6:
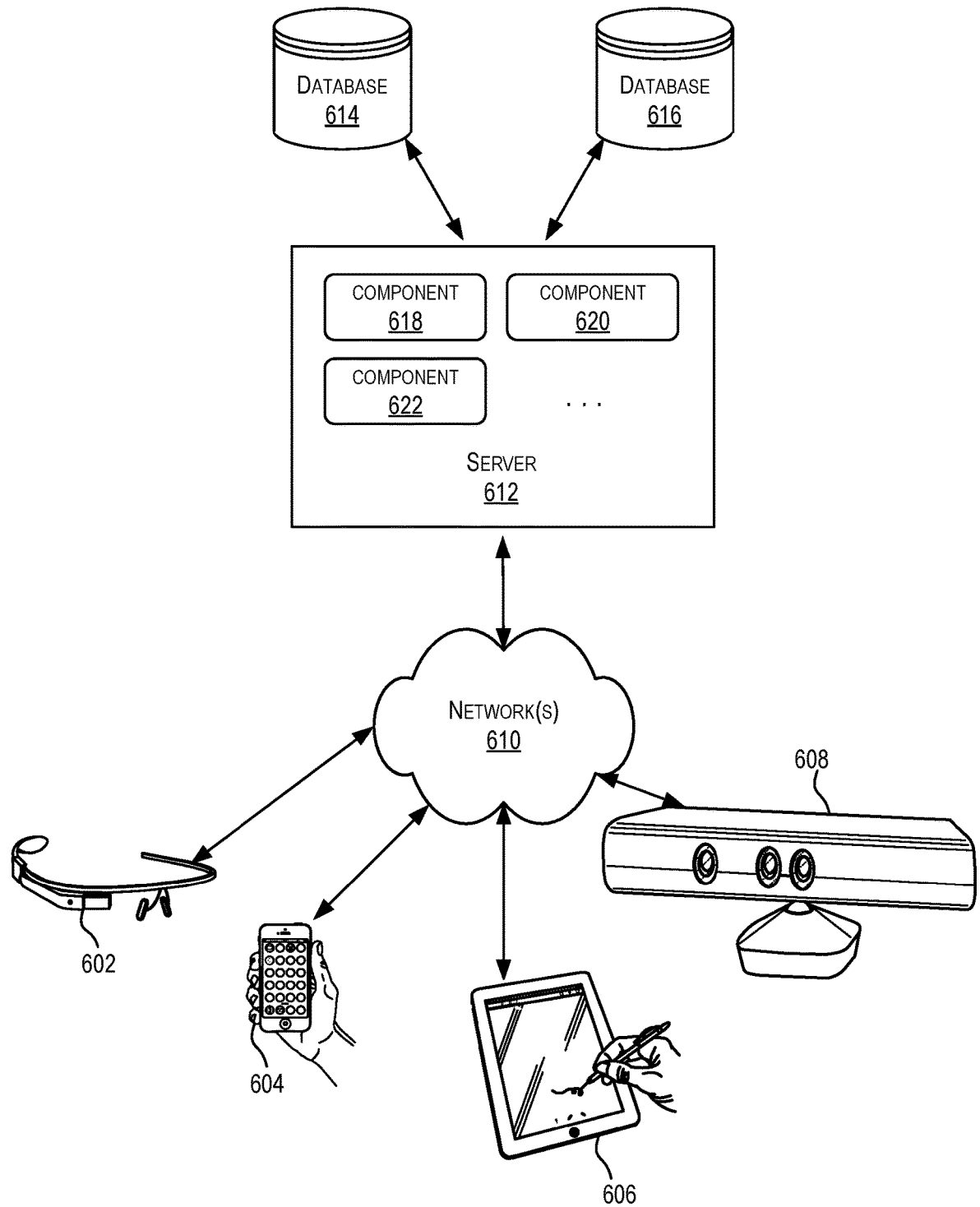
FIG. 6 depicts a simplified diagram of a distributed system for implementing one of the aspects.

FIG. 6 depicts a simplified diagram of a distributed system 600 for implementing one of the aspects. In the illustrated aspect, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network(s) 610.

In various aspects, server 612 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other aspects, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The aspect shown in the figure is thus one example of a distributed system for implementing an aspect system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various aspects, server 612 may be adapted to run one or more services or software applications described in the foregoing disclosure. For example, server 612 may correspond to a server for performing processing described above in accordance with an aspect of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of aspects, databases 614 and 616 may reside in a storage-area network (SAN). Similarly, any necessary files for performing the functions attributed to server 612 may be stored locally on server 612 and/or remotely, as appropriate. In one set of aspects, databases 614 and 616 may include relational databases, such as databases provided by Oracle, that are adapted to store, update, and retrieve data in response to SQL-formatted commands.

Figure 7:
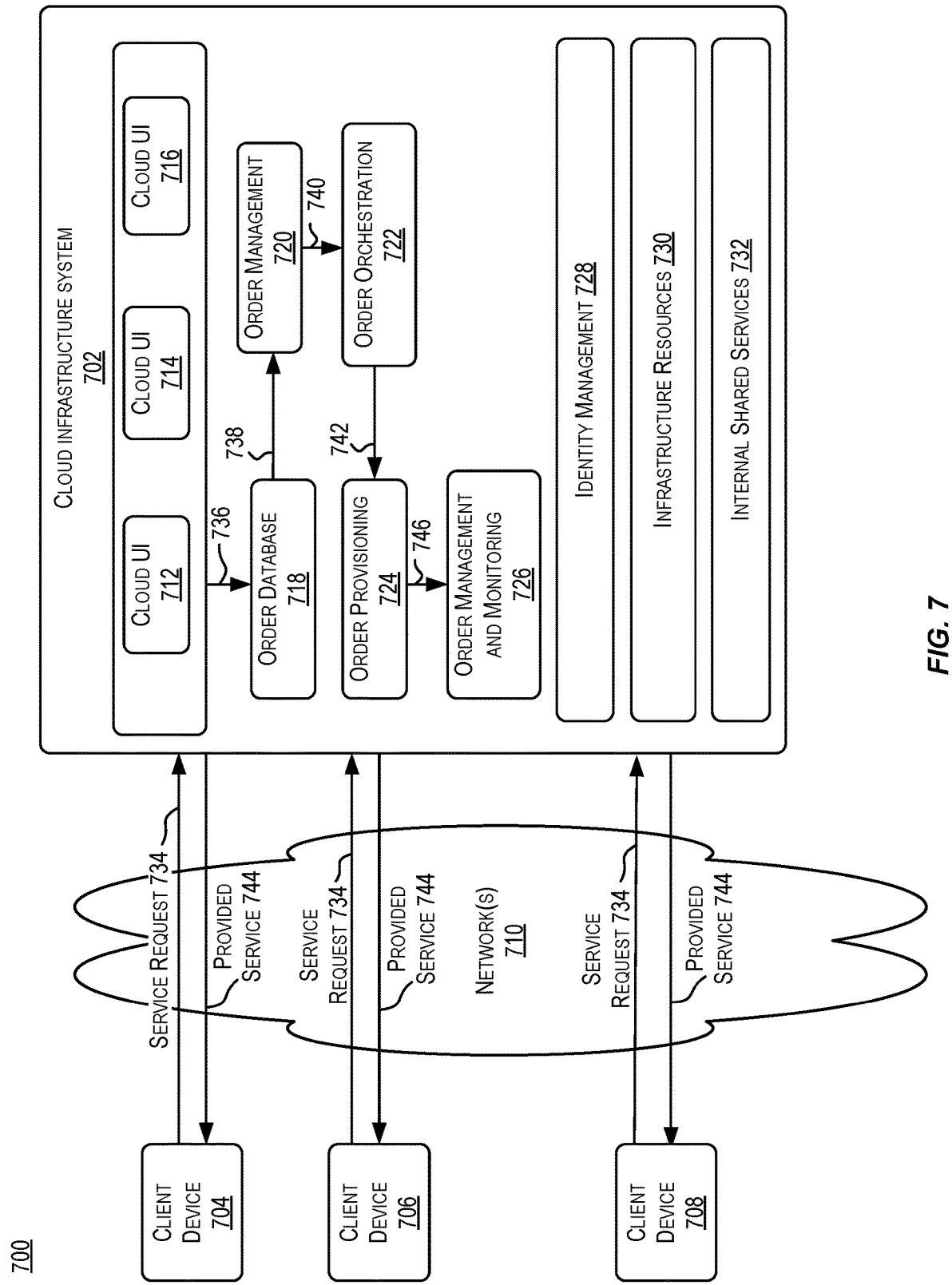
FIG. 7 is a simplified block diagram of components of a system environment by which services provided by the components of an aspect system may be offered as cloud services in accordance with an aspect.

FIG. 7 is a simplified block diagram of one or more components of a system environment 700 (e.g., a cloud infrastructure system) by which services provided by one or more components of an aspect system may be offered as cloud services, in accordance with an aspect of the present disclosure. In the illustrated aspect, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the aspect shown in the figure is only one example of a cloud infrastructure system that may incorporate an aspect of the invention. In some other aspects, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608 of FIG. 6.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between client computing devices 704, 706, and 708 and cloud infrastructure system 702. Each network may be any type of network familiar to those skilled in the art that can support data communications using any of a variety of commercially-available protocols, including those described above for network(s) 710.

Cloud infrastructure system 702 may comprise one or more computers and/or servers that may include those described above for server 612 of FIG. 6.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some aspects, the services provided by cloud infrastructure system 702 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some aspects, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 702 may also include infrastructure resources 730 for providing the resources used to provide various services to customers of the cloud infrastructure system. In one aspect, infrastructure resources 730 may include pre-integrated and optimized combinations of hardware, such as servers, storage, and networking resources to execute the services provided by the PaaS platform and the SaaS platform.

In some aspects, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 702 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 702, and the like.

In one aspect, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client computing devices 704, 706 or 708, may interact with cloud infrastructure system 702 by requesting one or more services provided by cloud infrastructure system 702 and placing an order for a subscription for one or more services offered by cloud infrastructure system 702. In certain aspects, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 in which the customer intends to subscribe.

After an order has been placed by the customer, the order information is received via the cloud UIs, 712, 714 and/or 716.

At operation 736, the order is stored in order database 718. Order database 718 can be one of several databases operated by cloud infrastructure system 702 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain aspects, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by system environment 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client computing devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain aspects, system environment 700 may include an identity management module 728. Identity management module 728 may be configured to provide identity services, such as access management and authorization services in system environment 700. In some aspects, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.). Identity management module 728 may also include the management of descriptive information about each customer and about how and by whom that descriptive information can be accessed and modified.

Figure 8:
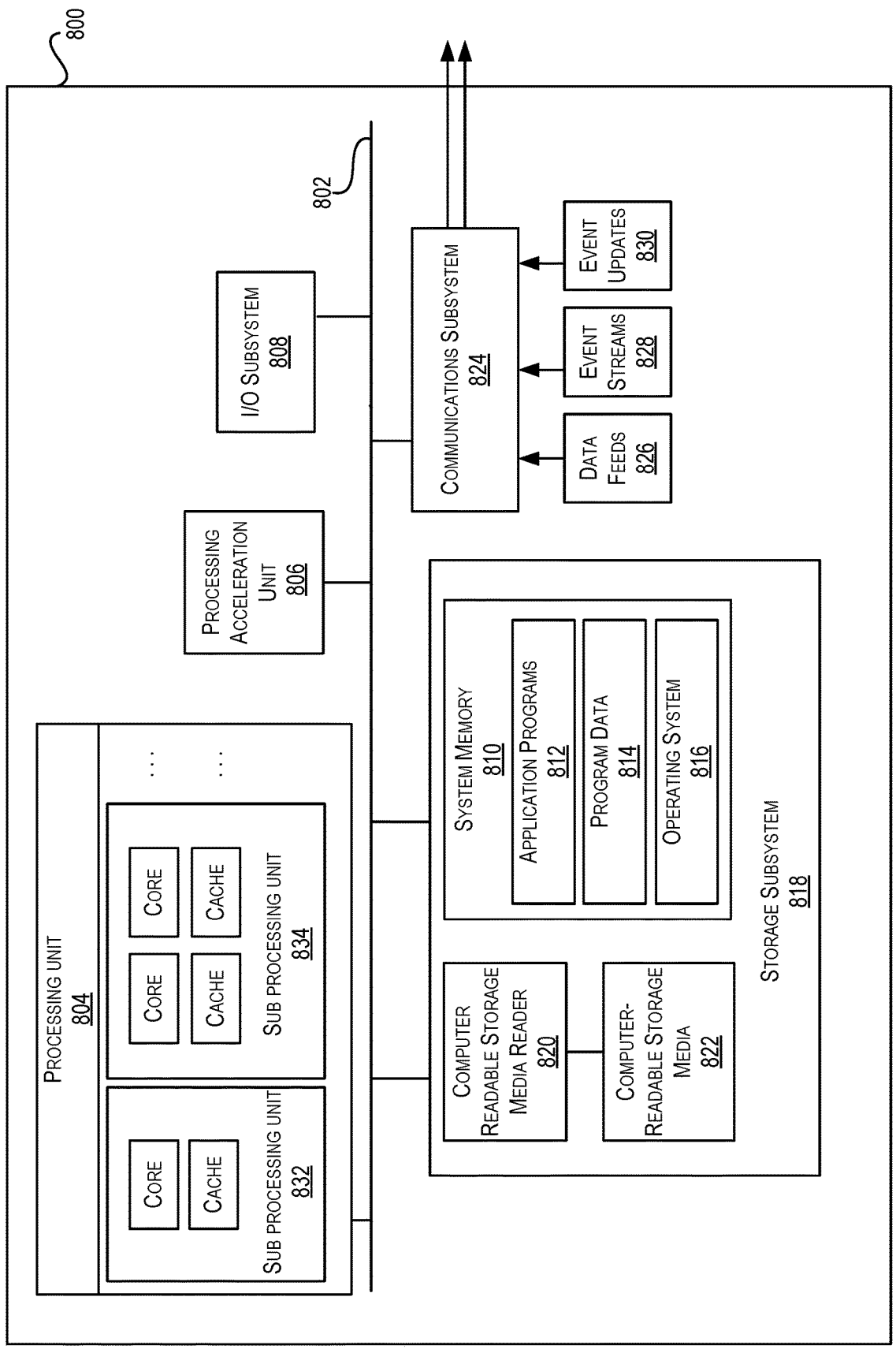
FIG. 8 illustrates an exemplary computer system, in which various aspects may be implemented.

FIG. 8 illustrates an exemplary computer system 800, in which various aspects may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain aspects, processing unit 804 may be implemented as one or more independent processing units 832 and/or 834 with single or multicore processors included in each processing unit. In other aspects, processing unit 804 may also be implemented as a quad-core processing unit formed by integrating two dual-core processors into a single chip.

In various aspects, processing unit 804 can execute a variety of programs in response to program code and can maintain multiple concurrently executing programs or processes. At any given time, some or all of the program code to be executed can be resident in processing unit 804 and/or in storage subsystem 818. Through suitable programming, processing unit 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some aspects. Software (programs, code modules, instructions) that when executed by a processor provide the functionality described above, may be stored in storage subsystem 818. These software modules or instructions may be executed by processing unit 804. Storage subsystem 818 may also provide a repository for storing data used in accordance with the present invention.

Storage subsystem 818 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 800.

By way of example, computer-readable storage media 822 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some aspects, communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 824 can provide wired network connectivity (e.g., Ethernet) in addition to or instead of a wireless interface.

In some aspects, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive unstructured data feeds 826 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for generating augmented training data for a machine learning model, the method comprising:
   accessing training data comprising a question and a body of text corresponding to an explanation associated with the question;
   constructing, using a computing device, a discourse tree from the body of text, the discourse tree representing rhetorical relationships between elementary discourse units of the body of text, each elementary discourse unit comprising one or more entities;
   generating an ordered chain of premises comprising a first premise of the body of text and a second premise of the body of text based at least in part on identifying, from the discourse tree, a particular type of rhetorical relationship exists between a first elementary discourse unit including the first premise and a second elementary discourse unit including the second premise;
   identifying, from the ordered chain of premises, that a premise is missing based on identifying that a first entity of the first premise lacks a connection to a second entity of the second premise;
   generating a query based on the first entity of the first premise and the second entity of the second premise;
   obtaining a candidate search result corresponding to the query;
   generating an additional discourse tree from the candidate search result;
   identifying that the additional discourse tree includes a rhetorical relation between the first entity of the first premise and the second entity of the second premise;
   generating the augmented training data comprising a complete discourse tree generated based at least in part on inserting the additional generated discourse tree into the discourse tree constructed from the body of text; and
   training a machine-learning model to identify explanations from input text, the machine-learning model being trained utilizing a supervised learning algorithm and the augmented training data.

2. The method of claim 1, further comprising:
   receiving, by the computing device, a subsequent question from a user device; and
   identifying a corresponding explanation to the subsequent question based on providing the subsequent question as input to the machine-learning model and receiving the corresponding explanation as output from the machine-learning model.

3. The method of claim 2, further comprising:
   generating an answer from the corresponding explanation received from the machine-learning model; and
   providing the answer to the user device in response to the subsequent question.

4. The method of claim 1, wherein the candidate search result is one of a set of candidate search results, and wherein the method further comprises:
   generating a set of discourse trees corresponding to each of the set of candidate search results;
   identifying a subset of the set of discourse trees that indicate a corresponding rhetorical relationship that links the first entity of the first premise and the second entity of the second premise; and
   selecting the additional discourse tree from the subset of the set of discourse trees.

5. The method of claim 4, further comprising:
   scoring each of the subset of the set of discourse trees based on a degree of relevancy between each candidate search result and the question, and selecting the additional discourse tree based on the score for each of the subset of the set of discourse trees.

6. The method of claim 1, wherein the query comprises a name, a head of a noun phrase, or a keyword extracted from the first premise or the second premise.

7. The method of claim 1, further comprising:
classifying the explanation as lacking information based on identifying the premise is missing, wherein generating the query based on the first entity and the second entity and obtaining the candidate search result corresponding to the query are performed based on classifying the explanation as lacking information.

8. A computing device comprising:
a computer-readable medium storing non-transitory computer-executable program instructions for generating augmented training data for a machine learning model; and
a processing device communicatively coupled to the computer-readable medium for executing the non-transitory computer-executable program instructions, wherein executing the non-transitory computer-executable program instructions configures the processing device to perform operations comprising:
 accessing training data comprising a question and a body of text corresponding to an explanation associated with the question;
 constructing a discourse tree from the body of text, the discourse tree representing rhetorical relationships between elementary discourse units of the body of text, each elementary discourse unit comprising one or more entities;
 generating an ordered chain of premises comprising a first premise of the body of text and a second premise of the body of text based at least in part on identifying, from the discourse tree, a type of rhetorical relationship exists between a first elementary discourse unit corresponding to the first premise and a second elementary discourse unit corresponding to the second premise;
 identifying, based on the ordered chain of premises, that a premise is missing based on identifying that a first entity of the first premise lacks a connection to a second entity of the second premise;
 generating a query based on the first entity of the first premise and the second entity of the second premise;
 obtaining a candidate search result corresponding to the query;
 generating an additional discourse tree from the candidate search result;
 identifying that the additional discourse tree includes a rhetorical relation between the first entity of the first premise and the second entity of the second premise;
 generating the augmented training data comprising a complete discourse tree generated based at least in part on inserting the additional generated discourse tree into the discourse tree constructed from the body of text; and
 training a machine-learning model to identify explanations from input text, the machine-learning model being trained utilizing a supervised learning algorithm and the augmented training data.

9. The computing device of claim 8, wherein the processing device performs further operations comprising:
receiving a subsequent question from a user device; and
identifying a corresponding explanation to the subsequent question based on providing the subsequent question as input to the machine-learning model and receiving corresponding explanation as output from the machine-learning model.

10. The computing device of claim 9, wherein the processing device performs further operations comprising:
generating an answer from the corresponding explanation received from the machine-learning model; and
providing the answer to the user device in response to the subsequent question.

11. The computing device of claim 8, wherein the candidate search result is one of a set of candidate search results, and wherein the processing device performs further operations comprising:
generating a set of discourse trees corresponding to each of the set of candidate search results;
identifying a subset of the set of discourse trees that indicate a rhetorical relationship that links the first entity of the first premise and the second entity of the second premise; and
selecting the additional discourse tree from the subset of the set of discourse trees.

12. The computing device of claim 11, wherein the processing device performs further operations comprising:
scoring each of the subset of the set of discourse trees based on a degree of relevancy between each candidate search result and the question, and
selecting the additional discourse tree based on the score for each of the subset of the set of discourse trees.

13. The computing device of claim 11, wherein the processing device performs further operations comprising:
classifying the explanation as lacking information based on identifying the premise is missing, wherein generating the query based on the first entity and the second entity and obtaining the candidate search result corresponding to the query are performed based on classifying the explanation as lacking information.

14. A non-transitory computer-readable storage medium storing computer-executable program instructions, wherein when executed by a processing device, the program instructions cause the processing device to perform operations comprising:
accessing training data comprising a question and a body of text corresponding to an explanation associated with the question;
constructing, using a computing device, a discourse tree from the body of text, the discourse tree representing rhetorical relationships between elementary discourse units of the body of text, each elementary discourse unit comprising one or more entities;
generating an ordered chain of premises comprising a first premise of the body of text and a second premise of the body of text based at least in part on identifying, from the discourse tree, a particular type of rhetorical relationship exists between a first elementary discourse unit including the first premise and a second elementary discourse unit including the second premise;
identifying, from the ordered chain of premises, that a premise is missing based on identifying that a first entity of the first premise lacks a connection to a second entity of the second premise;
generating a query based on the first entity of the first premise and the second entity of the second premise;
obtaining a candidate search result corresponding to the query;
generating an additional discourse tree from the candidate search result;

identifying that the additional discourse tree includes a rhetorical relation between the first entity of the first premise and the second entity of the second premise;

generating augmented training data comprising a complete discourse tree generated based at least in part on inserting the additional generated discourse tree into the discourse tree constructed from the body of text; and training a machine-learning model to identify explanations from input text, the machine-learning model being trained utilizing a supervised learning algorithm and the augmented training data.

15. The non-transitory computer-readable storage medium of claim 14, wherein the processing device performs further operations comprising:

receiving a subsequent question from a user device; and identifying a corresponding explanation to the subsequent question based on providing the subsequent question as input to the machine-learning model and receiving the corresponding explanation as output from the machine-learning model.

16. The non-transitory computer-readable storage medium of claim 15, wherein the processing device performs further operations comprising:

generating an answer from the corresponding explanation received from the machine-learning model; and providing the answer to the user device in response to the subsequent question.

17. The non-transitory computer-readable storage medium of claim 14, wherein the candidate search result is one of a set of candidate search results, and wherein the processing device performs further operations comprising:

generating a set of discourse trees corresponding to each of the set of candidate search results;

identifying a subset of the set of discourse trees that indicate a rhetorical relationship that links the first entity of the first premise and the second entity of the second premise; and selecting the additional discourse tree from the subset of the set of discourse trees.

18. The non-transitory computer-readable storage medium of claim 17, wherein the processing device performs further operations comprising:

scoring each of the subset of the set of discourse trees based on a degree of relevancy between each candidate search result and the question, and selecting the additional discourse tree based on the score for each of the subset of the set of discourse trees.

19. The non-transitory computer-readable storage medium of claim 14, wherein the query comprises a name, a head of a noun phrase, or a keyword extracted from the first premise or the second premise.

20. The non-transitory computer-readable storage medium of claim 14, wherein the processing device performs further operations comprising:

classifying the explanation as lacking information based on identifying the premise is missing, wherein generating the query based on the first entity and the second entity and obtaining the candidate search result corresponding to the query are performed based on classifying the explanation as lacking information.

* * * * *

UNITED STATES PATENT AND TRADEMARK OFFICE
CERTIFICATE OF CORRECTION

PATENT NO. : 11,556,698 B2
APPLICATION NO. : 16/902015
DATED : January 17, 2023
INVENTOR(S) : Boris Galitsky It is certified that error appears in the above-identified patent and that said Letters Patent is hereby corrected as shown below:

On the Title Page

On page 3, Column 2, item (56) under Other Publications, Line 3, delete "ov" and insert -- on --, therefor.

On page 4, Column 2, item (56) under Other Publications, Lines 34-35, delete "Summaization," and insert -- Summarization, --, therefor.

In the Drawings

On sheet 2 of 8, in FIG. 2, under Reference Numeral 204, Line 11, delete "ELBORATION" and insert -- ELABORATION --, therefor.

On sheet 3 of 8, in FIG. 3, under Reference Numeral 300, Line 9, delete "Likelihoo" and insert -- Likelihood --, therefor.

On sheet 3 of 8, in FIG. 3, under Reference Numeral 300, Line 12, delete "Occastion" and insert -- Occasion --, therefor.

In the Specification

In Column 2, Line 32, delete "discousre" and insert -- discourse --, therefor.

In Column 8, Line 32, delete "$T_2: P_1', \ldots, P_m \Rightarrow S$" and insert -- $T_2: P_1, P_i', \ldots, P_m \Rightarrow S$ --, therefor.

In Column 9, Line 64, delete "Internet" and insert -- Internetwork --, therefor.

In Column 19, Line 2, delete "evolution)," and insert -- evolution)), --, therefor.

Signed and Sealed this
Tenth Day of October, 2023

Katherine Kelly Vidal
*Director of the United States Patent and Trademark Office*